United States Patent [19]

Brander et al.

[11] Patent Number: 4,536,406
[45] Date of Patent: Aug. 20, 1985

[54] RED COLORED MEAT ANALOG

[75] Inventors: Rita W. Brander, New Rochelle, N.Y.; John E. Hammond, Glen Rock, N.J.; John H. Pasch, Putnam Valley, N.Y.

[73] Assignee: General Foods Corporation, White Plains, N.Y.

[21] Appl. No.: 587,478

[22] Filed: Mar. 8, 1984

[51] Int. Cl.$^3$ .................... A23J 3/00; A23L 1/275
[52] U.S. Cl. .................... 426/104; 426/250; 426/321; 426/540; 426/656; 426/802
[58] Field of Search ............ 426/104, 249, 250, 656, 426/540, 802, 321

[56] References Cited

U.S. PATENT DOCUMENTS

| | | | |
|---|---|---|---|
| 3,139,346 | 6/1964 | Meusel et al. | 426/540 |
| 3,911,141 | 10/1975 | Farr et al. | 426/540 X |
| 3,940,504 | 2/1976 | Jackel et al. | 426/540 |
| 3,958,019 | 5/1976 | Sato et al. | 426/540 X |
| 4,031,250 | 6/1977 | Haas et al. | 426/540 X |

*Primary Examiner*—Robert Yoncoskie
*Attorney, Agent, or Firm*—Joseph T. Harcarik; Thomas R. Savoie; Daniel J. Donovan

[57] ABSTRACT

Soy isolate based red meat analog products are colored red with laccaic acid and paprika.

14 Claims, No Drawings

RED COLORED MEAT ANALOG

BACKGROUND OF THE INVENTION

1. Field of the Invention

This invention relates to soy isolate based red meat analog products that are designed to simulate natural red meat based products.

2. Description of the Prior Art

Various sources of protein, other than natural meat protein, have been used in what are known as meat analog products as a substitute for the natural meat protein based products. In order to make such analog products more acceptable to the consumer, it is necessary to provide them with a color that is as close as possible to that of the natural meat protein based products. In preparing protein based analog products which are designed to simulate natural red meat based products, the coloring agent that has been used to date, for the most part, has been monascus red. However, it has been found that the use of colors other than monascus red as a coloring agent in soy isolate based analog products made by conventional procedures produces an analog product which has an undesirable blue/brown color, rather than a desired pink/orange color.

The use of paprika extract as a natural coloring agent for food is known (M.F.R. Jolley, Food Trade Review, November 1979, Pages 648–650). It is also known to use the extracted carotenoid oleoresin of paprika as a natural coloring agent for cheese, dressings and sausage products (B. Barenstein and R. H. Bunnell, Advances in Food Research, Vol. 15., 1966, Carotenoids-Properties and Food Uses, Pages 195–276, particularly pages 246–248).

However, when A. G. Dodson and J. Beacham investigated the possible use of paprika extract as a natural coloring agent in confectionery products, they found that although the paprika could be used in such products to provide, initially, quantities of red color of a satisfactory intensity, the general commercial use of paprika in such products was not desirable, and particularly in those type products that would require relatively long light stable characteristics. Further, to obtain any useful level of color with the paprika in such products, it was necessary to use relatively high levels of the paprika extract, i.e., twenty-seven times as much of the paprika extract was required as compared to the amount of the standard color (Sunset Yellow/Erythrosine) that could be used successfully in such products. Long mixing times were also required to use the paprika in such products, and, in such cases, unsuitable levels of precipitation or cloudiness were encountered. (Technical Circular No. 733, May 1981, The Use of Natural Colors in Confectionery Products. Part VI. Paprika, The British Food Manufacturing Industries Research Association).

Further, when the present applicants initally attempted to use laccaic acid as a red coloring agent in soy isolate based red meat analog products by blending in the laccaic acid using conventional blending procedures, and in place of the previously used monascus red coloring agent, the resulting color in the product was an undesired blue/brown color.

Prior to the present invention, it has not been readily possible to successfully use a natural red coloring agent other than monascus red in meat analog products based on vegetable protein such as soy isolate to provide a temperature and light stable product having acceptable, shelf-stable, red color characteristics.

SUMMARY OF THE PRESENT INVENTION

An object of the present invention is to provide a natural color additive which will provide an acceptable red color for soy isolate protein based red food analogs.

A further object of the present invention is to provide a procedure for employing paprika plus laccaic acid as a natural coloring agent for red meat analog products made with soy isolate protein.

These and other objects of the present invention are achieved, in accordance with the present invention, by employing, as a coloring agent for red meat analog products made with soy isolate protein, paprika in combination with laccaic acid and by first admixing the paprika with at least 60%, and preferably about 60 to 90%, of the soy isolate to be used, and then admixing such paprika/soy isolate mixture with the laccaic acid, with the laccaic acid being first admixed with any remaining soy isolate. For the purposes of the present invention about 0.30 to 0.40, and preferably about 0.32 to 0.37, weight % of the paprika, in the form of paprika powder, and about 0.04 to 1.2, and preferably about 0.06 to 1.00, weight % of the laccaic acid are used, based on the total weight of the final composition. Where paprika oleoresin is used instead of paprika powder, about 1/10 to 1/100 the amount of the powder is needed, for the purposes of the present invention.

The inventors have thus found that paprika can be used as a type of scavenger to react with the soy protein and render it inactive with respect to the laccaic acid, so that the laccaic acid can then be used as a red coloring agent in the presence of the soy protein.

DESCRIPTION OF THE PREFERRED EMBODIMENTS

The red meat analog products of the present invention are designed to simulate the following types of red colored natural meat products; frankfurters, Vienna sausage, pork balls, spam-like products and hamburger.

When made with soy isolate as a source of protein to be used therein, these analog products will contain about 10.0 to 11.0, and preferably about 10.2 to 10.8, weight % of the soy isolate. They will contain the following ranges of ingredients, depending on the more specific types of analog products, as noted above, that are contemplated:

| | Weight % | |
|---|---|---|
| Component of Analog | Broad Range | Preferred Range |
| Water | 40 to 50 | 44 to 46 |
| Oil | 10 to 20 | 14 to 16 |
| Carbohydrates (non-flavoring) | 0.5 to 2 | 1.2 to 1.9 |
| Flavoring (non-spice) | 5 to 15 | 9 to 11 |
| Spices | 0 to 5 | 1.0 to 3.0 |
| Gum | 0 to 1 | 0.3 to 0.5 |
| Protein (other than soy isolate) | | |
| heat coaguable | 4 to 8 | 5 to 7 |
| Non-heat coaguable | 0 to 30 | 12 to 14 |
| Soy Isolate | 10 to 11 | 10.2 to 10.8 |
| | 100 | 100 |

The term "soy isolate" or "soy isolate protein" means a product made by a, basically, three step process in which soy beans (1) have essentially all the soy bean oil therein extracted, (2) then have the soy flour therein precipitated out, and (3) then have the protein extracted therefrom with water. The extract is then dried. The final dried product or "soy isolate" contains at least 80, and preferably at least 85, weight % protein. It is also known as protein micelles. Procedures for making such products are disclosed in Canadian Pat. No. 1,028,552 and in U.S. Pat. No. 4,366,097. The soy isolate is thus a highly functional food ingredient made from dehulled cleaned whole soy beans.

The oils that are contemplated for use in the composition of the present invention would include vegetable oils such as soy bean oil, cottonseed oil, corn oil, palm kernel oil, coconut oil, safflower oil and rapeseed oil, as well as natural animal fats such as beef extractives and pork extractives.

In some products it may also be desired to include up to about 50 weight %, and preferably about 20 to 30 weight %, of natural meat (animal and/or fish) products in fine particle sized form, for flavoring or texturizing purposes, i.e., chicken, beef, pork and fish. The carbohydrates of a non-flavoring type that might be used in the compositions of the present invention would include starch, as such, such as amioca, tapioca, potato, corn and wheat starch, and in the form of flour such as wheat, potato, corn and rye flour. The non-spice flavorings that may be used in the compositions of the present invention would include sugar, salt and smoke or meat flavorings or extracts.

The spices that may be used in the compositions of the present invention would include onion in raw or powder form, ginger, white or red pepper, garlic, paprika, and mustard seed oil.

The gums that may be used in the compositions of the present invention would include xanthan gum, guar gum, locust bean gum, gum arabic and carboxy methyl cellulose.

In addition to the soy isolate protein other non-meat based proteinaceous materials may also be used in the compositions of the present invention. These proteinaceous materials may be of either the heat-coaguable or the heat non-coaguable types. The heat-coaguable types of protein would include egg albumin or egg white, bovine blood and vegetable proteins of the plant algae type.

The heat non-coaguable types of protein would include collagen, gelatin, wheat flour, fish meal and wheys.

In preparing the compositions of the present invention for the purposes contemplated herein it is necessary to first provide two or more phases, or subcompositions, from the components of the product that is to be made.

In one first phase, all of the paprika is admixed with at least 60 weight % of the soy isolate which is to be employed as well as with some of the other proposed ingredients of the final product. The first phase mixture of paprika and soy isolate should contain at least 3, and preferably at least 4, weight % of paprika powder based on the combined weight of the paprika powder and soy isolate.

The laccaic acid is first admixed, in one or more other phases, with any of the other remaining desired components of the final product.

After the first phase has been prepared, the phase containing the laccaic acid can then be added to such first phase. The final product will have a pH of about 6.8 to 7.2.

The analog products thus produced have an acceptable pink/orange color that simulates the red color of the natural product that the analog product is designed to simulate. Variations in the pink/orange color can be achieved by varying the amounts of the paprika and laccaic acid that are used. The products of the present invention retain their desirable color characteristics over a prolonged shelf life of at least twelve months, at 0° F.

EXAMPLES

A red meat analog product was made according to the present invention employing the following three phases, or subcompositions of components:

| Component | Phase I | Phase II | Phase III | Total % by Weight |
|---|---|---|---|---|
| | Parts by Weight | | | |
| Water | 285.21 | 163.18 | 9.90 | 45.83 |
| wheat flour | — | 21.22 | — | 2.12 |
| soy bean oil | 24.38 | 62.88 | 63.10 | 15.04 |
| soy isolate | 84.48 | 21.00 | — | 10.55 |
| egg white | — | 56.45 | 7.47 | 6.39 |
| pork skin collagen | — | 55.00 | — | 5.50 |
| onion - raw | — | 53.19 | — | 5.32 |
| beef extract | 4.14 | 28.04 | 3.82 | 3.60 |
| amioca starch | — | 14.15 | 0.85 | 1.50 |
| sugar | 4.11 | 6.13 | 2.16 | 1.24 |
| pork extract | 6.21 | 51.7 | — | 1.14 |
| xanthan gum | — | 1.20 | — | 0.12 |
| smoke flavor | 2.82 | — | 0.20 | 0.30 |
| meat flavor | 1.03 | 1.16 | 0.55 | 0.27 |
| spice | — | — | — | — |
| onion powder | 0.41 | 0.89 | — | 0.13 |
| ginger | 0.41 | 0.08 | — | 0.05 |
| white pepper | — | 0.89 | 0.14 | 0.10 |
| garlic | — | 0.18 | — | 0.02 |
| paprika | — | 0.08 | — | 0.008 |
| guar gum | — | 3.80 | — | 0.38 |
| HVP* | — | 0.83 | 1.12 | 0.20 |
| gelatin 235 | — | — | 0.69 | 0.06 |
| mustard seed oil | 0.03 | — | — | 0.003 |
| paprika | 3.60 | — | — | 0.36 |
| laccaic acid | — | 0.80 | — | 0.08 |
| | 416.83 | 496.32 | 90.00 | 100.311 |

*hydrolyzed vegetable protein

The soy isolate used in the Example had the following composition and properties:

| | Weight % |
|---|---|
| Protein (NX 5.71) | 85.3 |
| Water solubles (non-nitrogenous) | 5.7 |
| Moisture | 4.7 |
| Ash | 4.1 |
| Fat | 0.1 |
| Fiber | 0.1 |
| | 100.0 |

Mesh size - 170
specific volume - 2.6 ml/gram
viscosity - 44 cP as a 10% aqueous solution in distilled water All of the solid materials that were employed were used in powdered or diced (raw onion) form.

The desired meat product was prepared from Phases I, II and III as follows; the components of Phase I were first prepared by first dissolving the paprika powder (San Ei Paprika Powder 100) in the water and then blending the resulting suspension with the soy isolate, soy bean oil and mustard seed oil for 10 minutes in a food cutter at 3000 R.P.M. Then the smoke flavor, meat flavor, pork extract, beef extract, sugar, onion powder and ginger were added and the resulting admixture was mixed for 5 minutes at 3000 R.P.M. The resulting admixture was then held at room temperature (25± 5° C.) for 30 minute, and then the admixture was passed through a 3 mm to insure uniform particle size and to obtain maximum textural quality.

The resulting admixture can now be added to Phase II.

The components of Phase II were admixed as follows: the laccaic acid powder was first dissolved in the water and then this resulting suspension was then admixed with the soy isolate, wheat flour, egg white, starch, xanthan gum, skin collagen, soy bean oil and guar gum for 10 minutes in a food cutter at 3000 R.P.M. Then, to the resulting admixture, there was added the meat flavor, beef extract, pork extract, raw onion, white pepper, onion powder, garlic, ginger, paprika, HVP and sugar and this resulting admixture as then mixed for 5 minutes at 3000 R.P.M. The admixture of the Phase II components were then admixed with the admixture of the Phase I components for 45 seconds at 3000 R.P.M.

The components of Phase III were admixed as follows: the egg white, gelatin, starch, smoke flavor, sugar, HVP and white pepper were first admixed for 5 minutes in a 5 quart Hobart Mixer at Speed 1. Then the water was added and the resulting admixture was further mixed for 5 minutes in the Hobart Mixer at Speed 1. Then the meat flavor and beef extract were added over an additional period of 2 minutes while the admixture was being mixed in the Hobart Mixer at Speed 1. The soy bean oil was heated to 130° F. and then added to the admixture and mixed for 8 minutes in the Hobart Mixer at Speed 1.

The resulting Phase III admixture was then added to the combined Phase I and Phase II admixture, and the resulting admixture was mixed gently by hand and formed into meatball sized and shaped products. These meatball analog products were then placed in water, at 90° C., for 6 minutes, then steamed for 5 minutes at 230° F. (95° C.) and then cooled. The resulting products were frozen overnight at −40° C. and then packaged.

On being examined after a shelf-life period of 30 days, at 0° F., and while exposed to actinic light, it was found that these products retained a pink/orange color similar to that of precooked natural pork meat balls and did not have any objectional odor or taste.

What is claimed is:

1. A meat analog comprising soy isolate and coloring amounts of laccaic acid and paprika, wherein said paprika is present in amounts effective to render said soy isolate non-reactive to the laccaic acid.

2. A red meat protein analog containing soy isolate and formed from at least two phases, a first phase containing paprika and at least 60 weight % of the total weight of soy isolate in the analog and the remaining phases containing, coloring amounts of laccaic acid and 0–40% of said soy isolate, wherein said paprika is present in amounts effective to render said soy isolate non-reactive to the laccaic acid.

3. A red meat protein analog as in claim 2 comprising, in weight % based on the total weight of the analog, about 10 to 11% of soy isolate, about 0.30 to 0.40% paprika powder and about 0.04 to 0.12% laccaic acid.

4. A red meat protein analog as in claim 3 in which said first phase contains at least 3 to 4% by weight of paprika powder based on the weight of the soy isolate.

5. A red meat protein analog as in claim 3 which further comprises, in weight %, about 30 to 60% water, about 5 to 25% oil, about 3 to 9% egg albumin, flavorings and the balance other heat coaguable protein.

6. A red meat protein analog as in claim 5 in which up to about 30 weight % of the heat coaguable protein is replaced by heat non-coaguable protein.

7. A red meat analog product as in claim 5 comprising, in weight % based on the total weight of the analog, about 45.8% water, about 15% oil, about 6.4% egg albumin, about 10.5% soy isolate, about 0.35% paprika powder and about 0.08% of laccaic acid and flavorings.

8. A process for forming a red colored soy isolate protein analog which comprises forming a first phase comprising at least 60 weight % of the total weight of soy isolate in said analog product with about 3 to 4 weight % of paprika powder, based on the weight of said soy isolate and said paprika powder in said first phase, and one or more additional phases containing coloring amounts of laccaic acid and 0 to 40% of said soy isolate, and then admixing said phases.

9. A process as in claim 8 in which said first phase contains about 60 to 90 weight % of the soy isolate in said analog product.

10. A process as in claim 9 in which said analog product contains, in weight % based on the total weight of the analog, about 10 to 11% soy isolate, about 0.30 to 0.40% paprika powder and about 0.04 to 0.12% laccaic acid.

11. A process as in claim 8 in which said first phase contains about 4% paprika powder.

12. A process as in claim 10 in which said analog further comprises, in weight % based on the total weight of the analog, about 30 to 60% water, about 5 to 25% oil, about 3 to 9% egg albumin, flavorings and, the balance, other heat coaguable protein.

13. A process as in claim 12 in which up to about 30 weight % of the heat coaguable protein is replaced by heat non-coaguable protein.

14. A process as in claim 12 in which said analog comprises, in weight % based on the total weight of the analog, about 45.8% water, about 15% oil, about 6.4% egg albumin, about 10.5% soy isolate, about 0.35% paprika powder, and about 0.08% laccaic acid and flavorings.

* * * * *